US012591034B2

(12) United States Patent
Le Roux et al.

(10) Patent No.: US 12,591,034 B2
(45) Date of Patent: Mar. 31, 2026

(54) AIRFIELD MULTILATERATION SYSTEM WITH PRIVATE 5G CELLULAR NETWORK

(71) Applicant: ADB Safegate BV, Zaventem (BE)

(72) Inventors: Martin Le Roux, Huldenberg (BE); Luca Menè, Dubai (AE); Andrè Jelu, Hoegaarden (BE)

(73) Assignee: ADB Safegate BV, Zaventem (BE)

( * ) Notice: Subject to any disclaimer, the term of this patent is extended or adjusted under 35 U.S.C. 154(b) by 364 days.

(21) Appl. No.: 18/035,841

(22) PCT Filed: Nov. 5, 2021

(86) PCT No.: PCT/EP2021/080830
§ 371 (c)(1),
(2) Date: May 8, 2023

(87) PCT Pub. No.: WO2022/096680
PCT Pub. Date: May 12, 2022

(65) Prior Publication Data
US 2023/0400547 A1 Dec. 14, 2023

(30) Foreign Application Priority Data

Nov. 9, 2020 (EP) .................................... 20206498
Mar. 5, 2021 (EP) .................................... 21160929

(51) Int. Cl.
*G01S 5/02* (2010.01)
*G01S 5/06* (2006.01)
(Continued)

(52) U.S. Cl.
CPC ............ *G01S 5/02213* (2020.05); *G01S 5/06* (2013.01); *G08G 5/22* (2025.01); *G08G 5/26* (2025.01);
(Continued)

(58) Field of Classification Search
None
See application file for complete search history.

(56) References Cited

U.S. PATENT DOCUMENTS 10,490,086 B1 11/2019 Baker et al.
2008/0036659 A1 2/2008 Smith et al.
(Continued)

FOREIGN PATENT DOCUMENTS

CN 111486869 A 8/2020
WO 2010/138696 A1 12/2010
WO 2010/138696 A9 12/2010

*Primary Examiner* — Whitney Moore
(74) *Attorney, Agent, or Firm* — Rankin, Hill & Clark, LLP

(57) ABSTRACT

Airfield surveillance unit (11) for detecting airfield traffic and airfield multilateration system comprising such airfield surveillance unit. The airfield surveillance unit comprises a power supply module (113), a first radio antenna (111) configured to receive an aircraft transponder signal, a receiver module (112) coupled to the power supply module (113) and to the first radio antenna (111) and comprising a first data communication port (1122, 1123). The receiver module (112) is operable to convert the aircraft transponder signal received by the first radio antenna (111) to a multi-lateration-purpose signal for transmission via the first data communication port. The airfield surveillance unit further comprises a second radio antenna (118) and a 5G commu-nication module (117) coupled to the power supply module (113) and configured to be coupled to the second radio antenna for operating as a transceiver for a mission critical private 5G cellular network.

18 Claims, 4 Drawing Sheets

(51) Int. Cl.

| | |
|---|---|
| *G08G 5/22* | (2025.01) |
| *G08G 5/26* | (2025.01) |
| *G08G 5/51* | (2025.01) |
| *H04W 64/00* | (2009.01) |

(52) U.S. Cl.
CPC ............ *G08G 5/51* (2025.01); *H04W 64/006*
(2013.01); *G01S 2205/008* (2013.01); *G01S*
*2205/03* (2020.05)

(56)                          References Cited

U.S. PATENT DOCUMENTS

| | | |
|---|---|---|
| 2018/0068567 A1 | 3/2018 | Gong et al. |
| 2020/0242950 A1* | 7/2020 | Guo ......................... G08G 5/22 |
| 2022/0141703 A1* | 5/2022 | Dhammawat ......... H04W 76/12 |
| | | 370/328 |

* cited by examiner

AIRFIELD MULTILATERATION SYSTEM WITH PRIVATE 5G CELLULAR NETWORK

TECHNICAL FIELD

The present invention is related to devices and systems allowing to accurately determine the position of aircrafts and ground based vehicles on an airfield through a multilateration technique.

BACKGROUND ART

Multilateration systems for accurately determining the position of aircrafts and ground based vehicles on an airfield are known. By way of example, document EUROCAE (European Organisation for Civil Aviation Equipment) ED-117A Minimum Operational Performance Specification for Mode S Multilateration Systems for Use in Advanced Surface Movement Guidance and Control Systems (A-SMGCS) sets out minimal requirements for an airfield multilateration system. These systems typically are configured to listen to transponder signals that are broadcast from aircrafts and ground based vehicles equipped with such devices. These transponder signals are typically used in existing airfield traffic control systems, such as Automatic Dependent Surveillance—Broadcast (ADS-B) where the conventional radar systems interrogate the aircraft transponders to obtain identification, position, velocity and additional data of the aircraft or vehicle. Hence, multilateration systems can provide for an additional safety level when they are integrated in an advanced airfield surface movement guidance and control system (A-SGMCS).

To be able to determine aircraft and vehicle position, multilateration systems comprise distributed ground stations, referred to as remote surveillance units, which are arranged across the airfield. The disposition of the remote surveillance units must be such that, at each relevant location on the airfield, a transponder signal can be intercepted by multiple remote surveillance units simultaneously, allowing to determine position based on a time difference of arrival (TDOA) principle. Furthermore, the airfield area can be challenging in terms of multipath effects, wherein signals may arrive at the antenna of a remote surveillance unit by more than one route due to signal reflection by many objects of sufficient size, possibly imposing an additional number of remote surveillance units on the airfield to obtain a predetermined position accuracy level. As a result, quite a number of remote surveillance units typically would need to be installed on the airfield, and these would all need to be connected to power supply and data communication lines.

It follows that the roll-out of a multilateration system can be costly in terms of installation costs when power supply or data communication lines are unavailable at the desired locations. The high installation cost also constitutes an impediment for further expanding the multilateration system to cover a wider area of the airfield, e.g. in order to obtain Wide Area Multilateration (WAM).

U.S. Pat. No. 10,490,086, 26 Nov. 2019, describes a ground-based airport vehicle tracking service, including ground-based aircraft, which collects positional data from a plurality of remote data acquisition sites, including a plurality of different types, and processes and filters the data to identify various ground-based events and subsequently transmit notifications of such events to specified users. A number of remotely located servers are located on the airfield. Each location includes an ADS-B transceiver, a positional data server and an antenna. In each instance, the transceiver of that location is connected to both the positional data server and antenna of the same location via a series of connections and/or interfaces. Each location is connected to a network via a wired or wireless communication link. The locations report altitude, latitude and longitude for each position report for ADS-B equipped aircraft and ground vehicles.

Hence, the system described in U.S. Pat. No. 10,490,086 is not a multilateration system since no position data is determined through multilateration of signals received by a number of distributed antennas. To the contrary, in U.S. Pat. No. 10,490,086, the positional data of the ADS-B transmitted signal of the aircraft or vehicle is read. As a result, U.S. Pat. No. 10,490,086 does not require a large number of antenna locations.

SUMMARY

There is therefore a need in the art to provide for multilateration systems which are more economical in terms of installation and/or operational cost.

It is further an aim of the present invention to provide multilateration systems allowing for additional functionality.

According to a first aspect of the invention, there is therefore provided an airfield surveillance unit (or remote surveillance unit) for detecting an airfield moving object as set out in the appended claims.

An airfield surveillance unit as described herein comprises a power supply module, a first radio antenna configured to receive an aircraft transponder signal, a receiver module coupled to the power supply module and configured to be coupled to the first radio antenna for receiving the aircraft transponder signal. The receiver module comprises a first data communication port. The receiver module is operable to convert or process the aircraft transponder signal received by the first radio antenna for transmission via the first data communication port. By way of example, the receiver module is configured to convert the received aircraft transponder signal to a digital signal that is transmitted via the first data communication port. Advantageously, the receiver module is configured to convert or process the aircraft transponder signal and the aircraft transponder signal as converted or processed can be utilized for determining a position of a corresponding aircraft via multilateration. Advantageously, the receiver module is configured to convert or process the aircraft transponder signal such that it is usable for determining a position of a corresponding aircraft via multilateration, i.e. the aircraft transponder signal is converted to a multilateration-purpose signal. By way of example, the receiver module can be operable to add a time-stamp to the converted signal and to communicate the time-stamped signal via the first data communication port. Alternatively, a time-stamp can be added after transmission through the first data communication port, e.g. at a central processing unit of an airfield multilateration system.

According to an aspect of the present invention, the airfield surveillance unit further comprises a second radio antenna configured to receive and/or transmit 5G radio signals, and a 5G communication module coupled to the power supply module and configured to be coupled to the second radio antenna. The 5G communication module is operable to process 5G radio signals received or transmitted by the second radio antenna. Advantageously, the 5G communication module along with the second radio antenna are configured to operate as a transceiver for 5G radio communications. Advantageously, the 5G communication module along with the second radio antenna are configured to operate as a transceiver for a private 5G cellular network.

One advantage of equipping the airfield surveillance unit with a 5G communication module is that existing ground infrastructure of a multilateration system can be used for setting up a 5G cellular network providing optimal coverage of the airfield area. This reduces total installation costs, providing a low-cost solution to roll out a 5G local, private network, specifically for mission critical communication on airfield premises. One example of a mission critical communication on the airfield is detection and identification of aircraft movement, such as performed by the airfield surveillance units and systems described herein. Furthermore, power supply circuitry can be shared between the receiver module and the 5G communication module of the airfield surveillance unit.

Advantageously, the receiver module and the 5G communication module are operably coupled for data communication. In particular, the 5G communication module comprises a data communication port connected to the first data communication port of the receiver module for receiving the digital representation of the aircraft transponder signal. The 5G communication module is advantageously configured to process the digital representation for transmission via the second radio antenna.

By allowing data communication between the 5G communication module and the receiver module of the airfield surveillance unit, a cellular (5G) and mission critical communication channel can be created for communicating multilateration critical data from the remote airfield surveillance unit to a central processing unit. This cellular (wireless) communication channel can be provided in addition to, or in alternative to existing and possibly wired communication channels between the remote airfield surveillance unit and the central processing unit. In particular, the 5G communication channel can provide for communication redundancy, and/or can aid in decongesting existing critical data communication channels, such as the 1030/1090 MHz channel. This improves safety and security of the multilateration system and any system dependent thereupon, such as an A-SMGCS. Furthermore, by integrating the 5G communication channels into the data communication lines of the multilateration system, additional communication bandwidth can be created to allow more multilateration critical data to be communicated from the remote surveillance units to the central processing unit allowing to further increase positional accuracy of the multilateration system.

According to a second aspect of the invention, there is provided an airfield multilateration system as set out in the appended claims.

An airfield multilateration system as described herein comprises a plurality of remote surveillance units as described herein and a central processing unit operably coupled to the plurality of remote surveillance units for data communication, e.g. through one or a plurality of data communication lines. The central processing unit comprises a processing module operable to determine an aircraft location based on the aircraft transponder signal received by multiple ones of the plurality of remote surveillance units. Advantageously, one of the data communication lines can be a 5G network operated by the 5G communication modules of the remote surveillance units.

A method of detecting airfield traffic through multilateration is described herein as well. The method detects airfield traffic through the airfield multilateration system as described herein, comprising setting up a private 5G cellular network. The 5G communication modules of the plurality of airfield surveillance units and possibly the central processing unit communicate mission critical data through the private 5G cellular network. The mission critical data may include multilateration related data provided by the receiver modules or central processing unit of the airfield multilateration system.

BRIEF DESCRIPTION OF THE FIGURES

Aspects of the invention will now be described in more detail with reference to the appended drawings, wherein same reference numerals illustrate same features and wherein.

DETAILED DESCRIPTION

Figure 1:
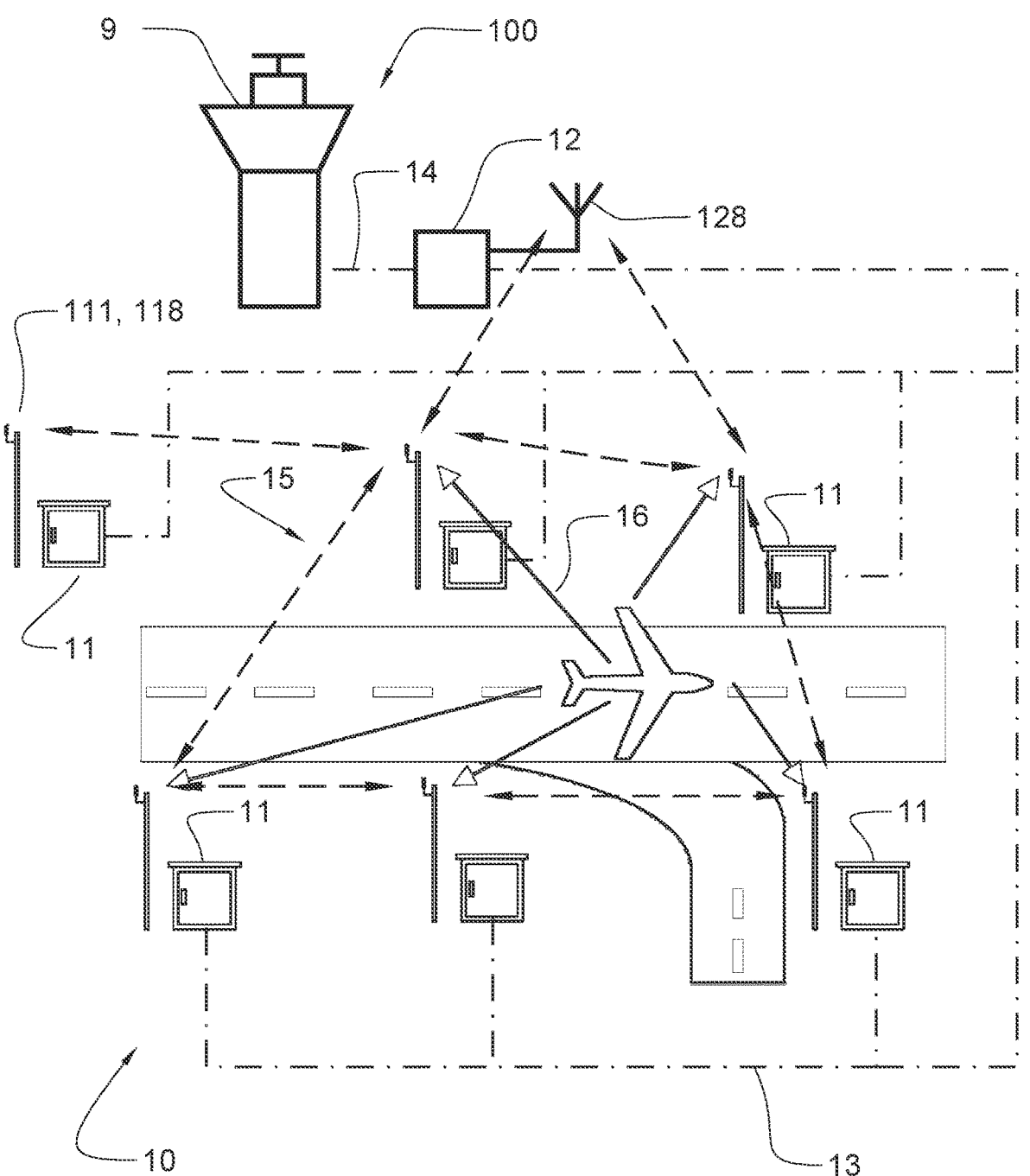
FIG. 1 represents a diagram of an exemplary multilateration system according to aspects of the present invention.

Referring to FIG. 1, an airfield multilateration system 10 comprises a plurality of surveillance units 11 distributed on an area of interest of the airfield or airport 100. The surveillance units 11, also known as ground stations, will be referred to herein as remote surveillance units or airfield surveillance units. The area of interest can typically comprise one or more of the runway area, taxiway area, Apron, and any other area of the airfield as desired. The remote surveillance units 11 are all connected to a central processing unit 12 through an advantageously wired data communication link 13. The central processing unit 12 can further be connected to the Surface Movement Guidance and Control System (SMGCS) of the airport, schematically represented in FIG. 1 by the control tower 9, to feed calculated position data of aircrafts and airfield vehicles to the SMGCS via a possibly wired data communication link 14.

The remote surveillance units 11 are advantageously configured for receiving 1090 MHz signals 16, such as ACAS (Airborne Collision Avoidance System) transmissions, ADS-B broadcasts and Mode S/SSR replies originating from on-board transmitting devices. Possible message formats are defined in Annex 10 to the Convention on International Civil Aviation, Aeronautical Communications, Volume IV, Surface and Collision Avoidance Systems, International Civil Aviation Organisation (ICAO). Additionally, the remote surveillance units can be configured to interrogating vehicles or aircrafts according to the same standard as well.

Figure 2:
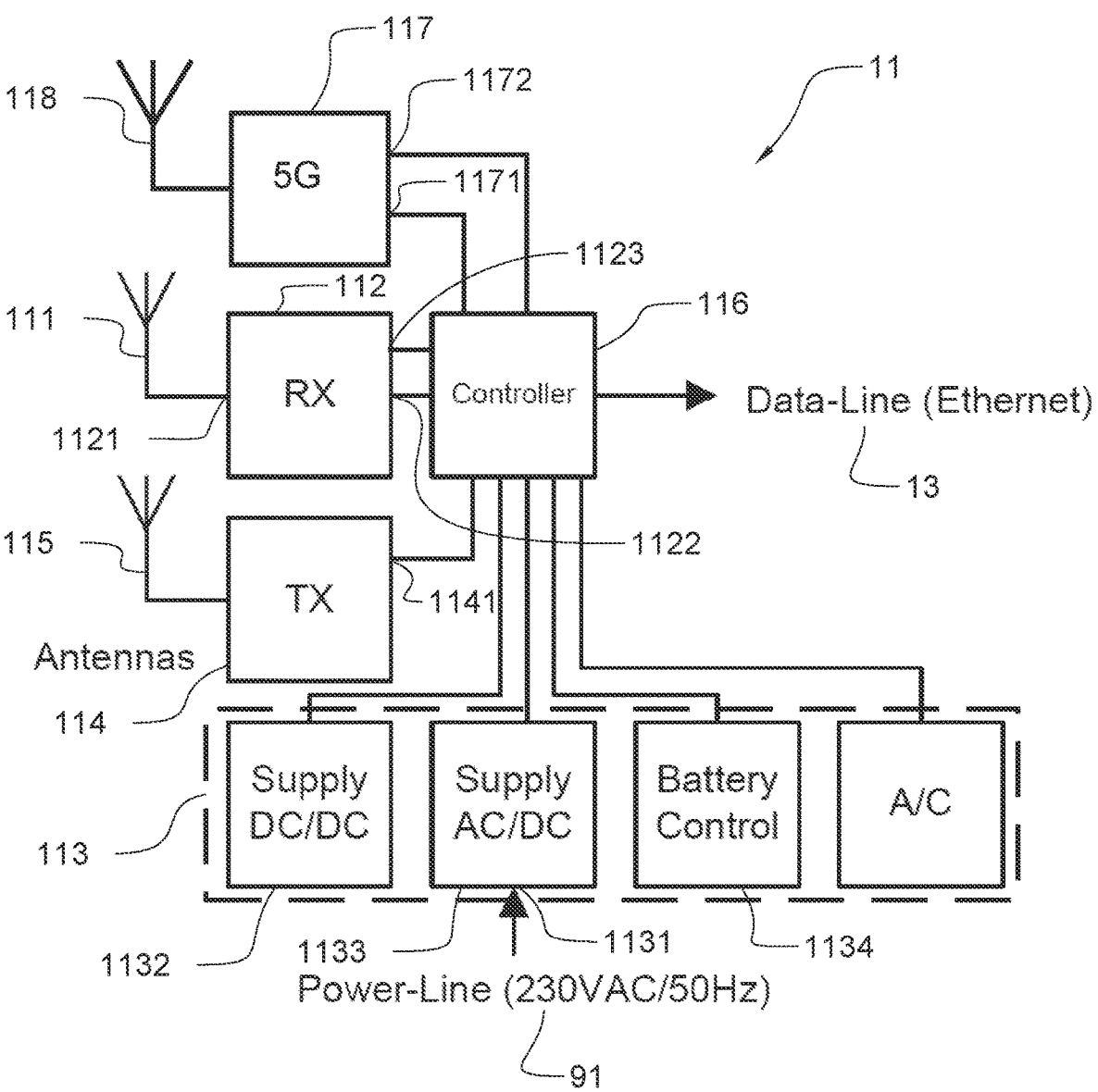
FIG. 2 represents a diagram of an exemplary embodiment of a remote surveillance unit of a multilateration system according to aspects of the present invention.

To this end, and referring to FIG. 2, each remote surveillance unit 11 comprises a receive radio antenna 111 capable of receiving/intercepting transponder messages, a receiver module 112, and a power supply module 113. Receiver module 112 comprises a signal input port 1121 coupled to antenna 111 and a data output port 1122 which in use is connected to data communication link 13 connecting the remote surveillance unit 11 to the central processing unit 12.

Optionally, the remote surveillance unit 11 comprises a transmitter module 114 coupled to a transmit radio antenna 115, which may or may not be integrated with receive antenna 111 into a single antenna. The transmitter module 114 is typically configured for transmitting transponder interrogation signals.

Optionally, the remote surveillance unit 11 comprises a control module 116 operably coupled to receiver module 112 and/or transmitter module 114 for controlling operation thereof. Power supply module 113 is coupled to any of the above modules to supply the modules with electrical power. Power supply module 113 comprises a power input terminal 1131 for connection to an external power supply line 91, suitable power conversion circuitry 1132-1133 for converting the external power to operating voltages of the respective modules and components, and additionally or alternatively an internal energy storage device, such as a battery 1134, e.g. to ensure operation in case of external power failure.

All modules 112, 113, 114, 116 can be accommodated in a housing of the remote surveillance unit, such as a cabinet.

In an ADS-B transponder communication system, interrogation messages are transmitted at 1030 MHz and the transponder device on board the aircraft communicates its response at 1090 MHz. To this end, the receive antenna 111 and/or transmit antenna 115 is operable in a frequency range of 1030 MHz-1090 MHz. The antennas may be configured to transmit in any appropriate power range. The antenna may be configured as a half-wave dipole, and advantageously having a vertical polarization direction as the antenna is typically mounted vertically. The antenna can be provided with a reflector for reducing the azimuth range, e.g. from 3600 to 190°, which may aid in multi-path effect reduction.

Figure 3:
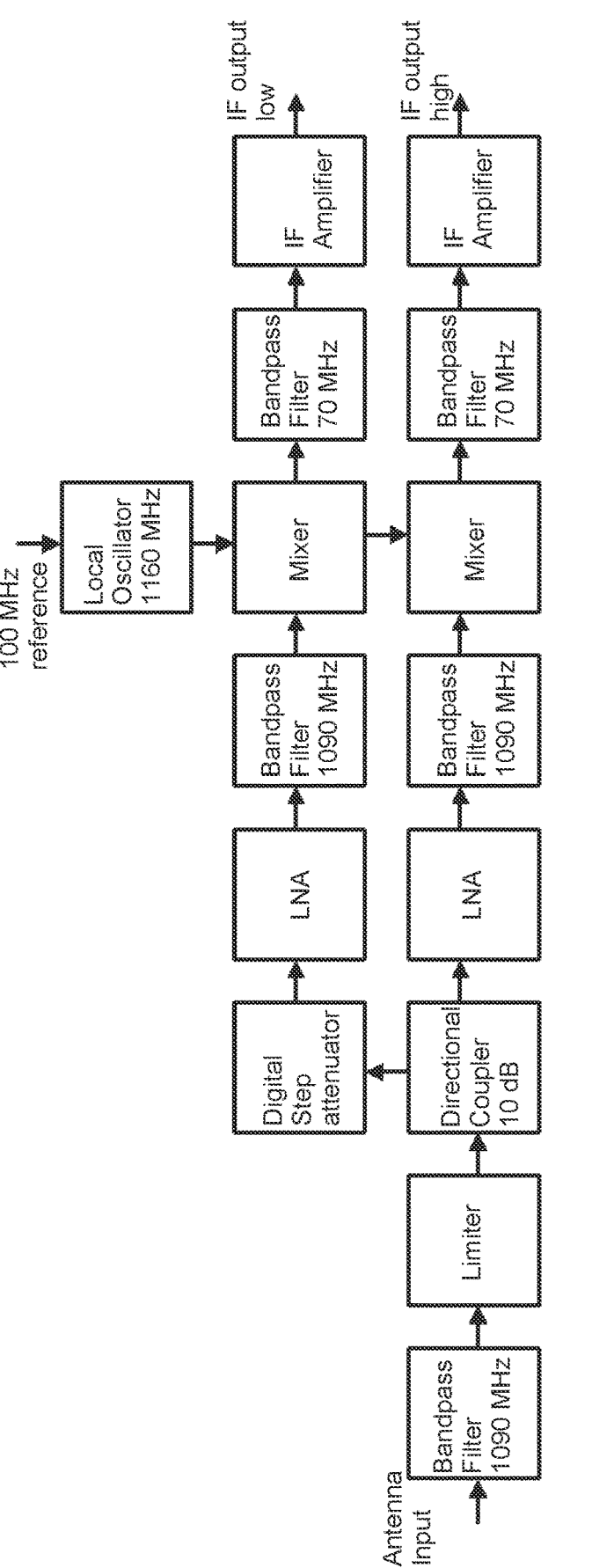
FIG. 3 represents a diagram of an exemplary embodiment of a receiver module of a remote surveillance unit according to aspects of the present invention.

Referring to FIG. 3, the receiver module 112 advantageously comprises an oscillator, a downconverter for downconverting the 1090 MHz signals, such as a dual channel 1090 MHz to 70 MHz downconverter chain, a digital modulator, and any required decoding and modulating circuitry. All these functional blocks can be provided in one or more circuits. Further, the receiver module 112 is advantageously capable of communicating with every other module of the remote surveillance unit and may control operation of the remote surveillance unit modules, i.e. the control module 116 can be integrated in the receiver module 112.

The receiver module 112 can operate as follows. The signal received by antenna 111 is passed into a pre-selector bandpass filter and optionally a signal limiter for overdrive protection. This configuration protects the receiving chain from saturation by a jamming signal outside the operation frequency. From the limiter the signal is then fed to a splitter, feeding the signal to a dual-channel downconverter chain. By way of example, the signal is split through a 10 dB directional coupler in a direct signal chain (lower signal chain in FIG. 3) and an attenuated signal chain (upper signal chain in FIG. 3). The attenuated signal may be further attenuated by a digital step attenuator. Each of the direct signal chain and the attenuated signal chain can comprise a low noise amplifier (LNA), followed by a bandpass filter. Next, the mixer converts the 1090 MHz signal down to the intermediate frequency (IF) of 70 MHz. The 70 MHz signal can be filtered by a bandpass section, amplified and fed to the analog-to-digital converters (ADCs). The receiver can be construed as a direct intermediate-frequency (IF) sampling architecture. The 1160 MHz local oscillator coupled to the mixers is advantageously PLL stabilized by a 100 MHz reference signal.

The receiver module 112 can further be configured to time-stamp the digitalized messages and to communicate the time-stamped messages to the data output port 1122, from where they are further sent to the central processing unit 12 via data communication link 13, possibly through control module 116.

The transmitter module 114 can be configured for interrogating transponders, e.g. on 1030 MHz frequency. The transponders are interrogated by sending Mode-S interrogations. The interrogations can be triggered by the central processing unit 12 which may define the type and content of the interrogations and send them to the remote surveillance units 11, where the command messages from the central processing unit may be received wirelessly through antenna 115, or through another data communication line, e.g. data communication link 13. Transponder interrogation can be useful to obtain further information from the aircraft or vehicle which is not automatically broadcast. This may help in improving positional accuracy.

In addition, or alternatively, the transmitter module 114 can be configured as a reference transmitter for periodically transmitting synchronization messages, which are used by the receiver modules 112 for synchronization. In reference transmitting mode, the transmitter is advantageously configured to transmit at a same frequency as the one at which receiver modules receive signals, e.g. 1090 MHz. By way of example, when operating as a reference transmitter, the transmitter module can send 1090 MHz Mode-S reply messages at a configured rate (typically 1 reply per second). The Mode S reply signals can be compliant to the constraints defined in Annex 10 to the Convention on International Civil Aviation, Aeronautical Communications, Volume IV, Surface and Collision Avoidance Systems, International Civil Aviation Organisation (ICAO).

The data output from the remote surveillance units 11 can comprise surface surveillance radar (SSR) reply receptions, interrogation information and service messages. SSR receptions and interrogation information contain accurate time of arrival (TOA) or time of interrogation (TOI) timestamps, which can form an input for the Multilateration calculation performed by the central processing unit. Remote surveillance unit output data can furthermore contain payload data of the SSR replies such as Mode-A/C and/or Mode-S information. This payload information can be used as the input for the Mode-S and ADS-B decoding.

Figure 4:
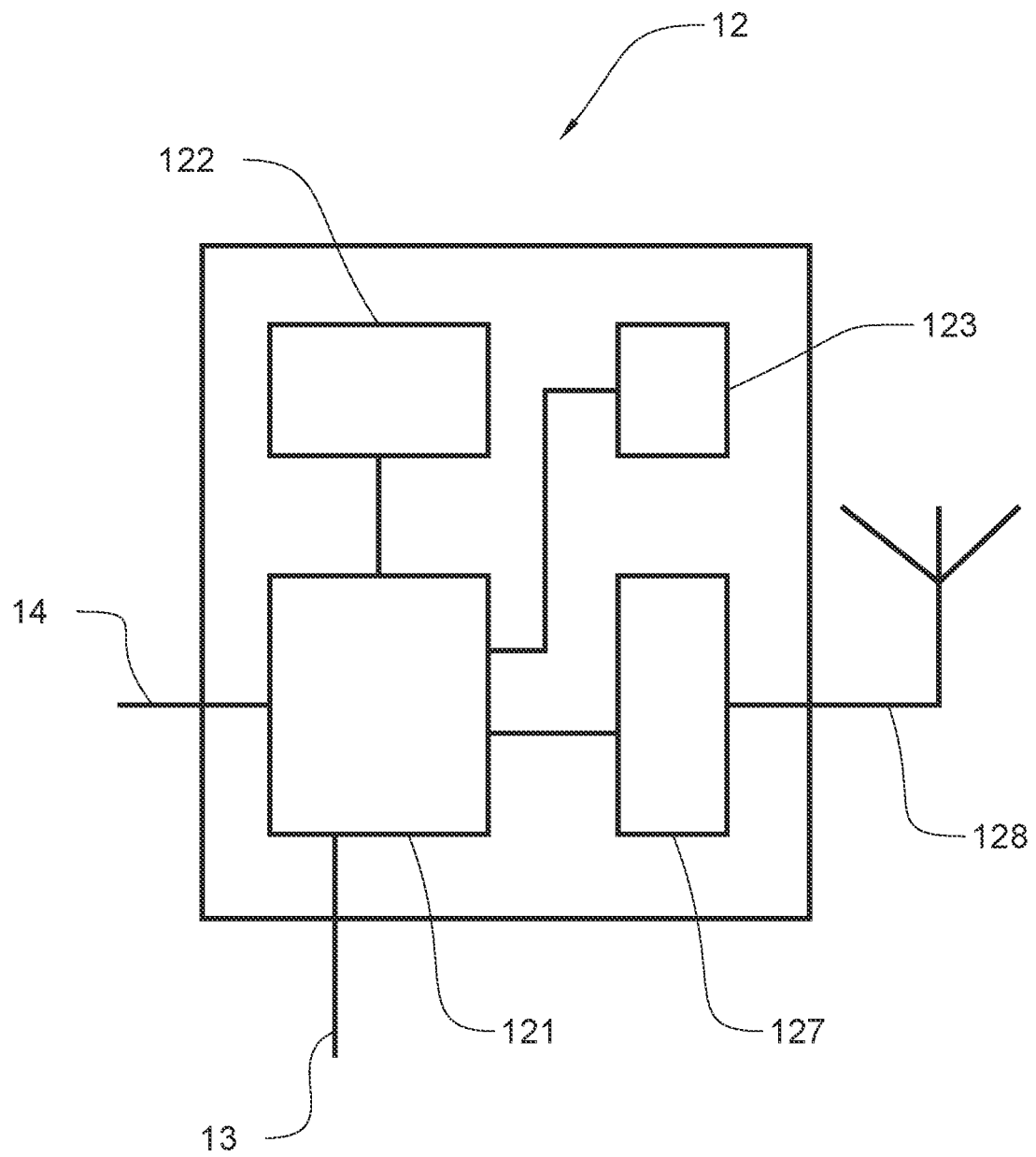
FIG. 4 represents a diagram of an exemplary embodiment of a central processing unit of a multilateration system according to aspects of the present invention.

Referring to FIG. 4, the central processing unit 12 is configured to receive data output by the remote surveillance units 11, e.g. via data communication link 13. The central processing unit further comprises a computing and control module 121 configured to process this data for determining an object position through multilateration techniques. The object position can form an output of the multilateration system and the central processing unit can be configured to provide the output to the user, which can be a SMGCS or any other airfield traffic control system, e.g. via data communication link 14. The central processing unit can comprise a suitable user interface 122. In addition, the central processing unit can be configured to control the remote surveillance units by sending them command messages. These commands can be used to trigger transponder interrogations by the transmitter modules 114 of the remote surveillance units and/or select a mode of operation of the remote surveillance units.

One specific task of the computing and control module 121 is to calculate aircraft and other ground vehicle position via multilateration based on the time-stamped messages received by the remote surveillance units 11, advantageously according to the TDOA principle. Before the calculation can be performed, the computing and control module must determine which timestamps/measurements belong to one and the same signal emission. This is performed in a tuple mapping step where payload data and timestamps are used to identify measurements which belong together. Tuples of measurements are generated as output and are forwarded to the calculation step.

The central processing unit calculates the object positions from the time difference of signal arrival measurements of the tuples as explained above. Two types of calculations are possible: Hyperbolical Multilateration and Elliptical Multilateration and the central processing unit may be configured to use any one of these for determining the position of an object. In addition, the position calculation can be performed in 3D or also in 2D in case the height determination is neglected or if the height is already known. If 2D calculations are performed, the measured time differences of signal arrival (TDOA) lead to hyperbolas in the horizontal plane. If at least two linear independent TDOA measurements are available, for which at least 3 time of signal arrival (TOA) measurements from different stations must be available, the hyperbolas intersect at the point the signal was emitted. In the 3D calculation hyperboloids are used instead of hyperbolas, so the height coordinate can also be determined. However, one more TDOA is necessary for a solution, so at least 4 receiving stations are needed for the 3D solution. The 3 or 4 stations are the minimum needed in order to determine a position. As a MLAT system consists of several receivers, mostly there are more measurements available. These additional measurements are also involved in the calculation to increase the solution accuracy. Hyperbolical Multilateration is highly accurate in the area enclosed by the RSUs, e.g. the airport/runway/taxiway/apron area. It only uses the time of signal arrival (TOA) measurements of the transponder replies.

Elliptical Multilateration can be used to determine the position of objects outside the area enclosed by the RSUs, e.g. the approach area. In the latter case, the objects need to be interrogated by the system as the TOA as well as time of interrogation (TOI) measurements are required to determine the object position. The time of interrogation (TOI) refers to the signals travel time from the interrogating (transmitter) module up to the transponder and back down to the receiver module. Having this knowledge, in addition to the hyperbolas, an ellipse is obtained which leads to a better intersection geometry. However, due to the inaccurate reply delay of the SSR transponders (±150 m in Mode-A/C and ±75 m in Mode-S), the elliptical calculation can be less accurate than the hyperbolical calculation, and positional accuracy is generally only improved in the outside areas, which are not enclosed by RSUs.

Both calculation types can be performed to obtain a two-dimensional (2D) or three-dimensional (3D—including height information) calculation type. Data from three receivers permits the system to determine a 2D position estimate. Data from a fourth receiver is required to determine a 3D position estimate. Alternatively, a 3D positional estimate can be calculated using only three receivers when altitude can be ascertained from an outside source, such as Mode C code or 'on ground' bit from the aircraft transponder. Downlinked altitude information can be used as additional information in the multilateration calculation in order to increase the height accuracy. The downlinked altitude information is mostly available in the form of air pressure dependent flight levels and can be converted into a height. This can be performed via QNH (barometric altimeter setting) information, if provided to the central processing unit, or via fixed transponders with known height.

Multilateration systems as described herein can be passive multilateration systems or active multilateration systems. A passive multilateration system uses transponder broadcasts and/or acquisition squitters. The passive multilateration system is not configured to interrogate transponder devices. In particular, the remote surveillance units of a passive multilateration system may not comprise transmitter modules 114 configured to interrogate the transponder devices. Passive multilateration systems can perform hyperbolic multilateration, but not elliptic multilateration. Since the broadcast transponder messages only contain limited information, the availability of transponder data is however limited.

An active multilateration system comprises remote surveillance units incorporating transmitter modules 114 configured to send transponder interrogation messages as described hereinabove. Transponder interrogation messages can be used for gathering Time of Interrogation (TOI) timestamps which are needed in elliptic multilateration and/or gathering transponder data such as Altitude, Identification, etc. which is sometimes not automatically broadcast by transponders.

In an active multilateration system, the central processing unit comprises interrogation logic configured to determine whether an object needs to be interrogated and which data shall be requested. Therefore, the logic needs knowledge of the received Mode-S data. By knowing the received data it determines which transponder needs to be interrogated, and which data is needed from it.

The central processing unit can comprise a Mode-S and/or Mode A/C decoding module 123 configured to extract and decode respective Mode-S and/or Mode A/C data available in the transponder reply messages received by the RSU. Possible Mode-S downlink formats (DF) that can be selected to be decoded by the decoding module are one or more of the following:

DF4, Altitude Reply: This DF contains the barometric target altitude; It is only available if interrogated by the system;

DF5, Identify Reply: This DF contains the target identification, also known as Mode-A code; It is only available if interrogated by the system;

DF11, All call reply/acquisition squitter: This DF is broadcasted continuously by every Mode-S transponder and contains the Mode-S address of the target;

DF17, Extended Squitter: In this DF the ADS-B data is broadcasted by targets capable to provide ADS-B information;

DF18, Extended Squitter/non Transponder: The same as DF17 but sent by devices which cannot be interrogated, e.g. vehicle squitters.

Another task of the central processing unit can be time synchronization of the remote surveillance units. The object positions are advantageously calculated via the Time Difference of Signal Arrival (TDOA), i.e. the time difference between the "arrivals" of one transponder's signal received at the receiver modules of several remote surveillance units. This TDOA should be highly accurate in the range of 1 to 10 nanoseconds which is equivalent to a range measurement accuracy of 0.3 to 3 meters. This accuracy can be achieved by the use of highly stable oscillators at the remote surveillance units and by an appropriate synchronization algorithm in the computing and control module 121.

One possible synchronization algorithm makes use of 1090 MHz SSR reply signals continuously emitted by remote surveillance units (RSU) equipped with transmitting modules with reference transmitter functionality as described hereinabove. These replies are received at the RSU which have direct line of sight to the transmitter RSU. As the positions of the RSU are accurately known to the central processing unit, a common time base for all RSU can be calculated as known in the art.

Due to the system topology not all RSU must necessarily have direct line of sight between each other. In the latter case, more than one transmitter can be used for synchronization. The RSUs can be grouped into several synchronization clusters, each formed of a reference transmitter RSU and the RSUs that are seen by it. Some RSUs that are in line of sight of more than one reference transmitter RSU can form part of more than one synchronization cluster. To maintain the common time base the clusters have to be synchronized with each other. This can be realized over specific RSU which are seen by multiple reference transmitter RSU.

An alternative possible synchronization method makes use of a central clock. With this method, the transponder signals received by the receiver modules are time-stamped centrally at the central processing unit 12. This method removes the need to compensate for time differences between receivers. Yet alternatively, use can be made of Global Navigation Satellite System (GNSS) signals, wherein a GNSS signal, such as the 1 PPS GNSS receiver signal can be used as common signal and received by all receiver modules which can time-stamp the received transponder messages based on the GNSS signal. Additional precision can be achieved through synchronisation to a common transmitting satellite (known as the Common View method).

Referring back to FIGS. 1 and 2, according to an aspect of the present invention, the remote surveillance unit 11 further comprises a 5G communication module 117 coupled to a 5G antenna 118. The 5G communication module 117 is configured to process 5G radio signals which are received by antenna 118. In particular, 5G communication module 117 advantageously is configured to operate as a base station of a 5G cellular network 15.

In the present disclosure, the term '5G' can refer to any radio access technology operating according to the International Mobile Telecommunications-2020 (IMT-2020) standard issued by the Radiocommunication Sector (ITU-R) of the International Telecommunication Union (ITU), and/or according to any one of the 5G radio access technologies set out by the 3GPP (3$^{rd}$ Generation Partnership Project) consortium, such as but not limited to 5G NR (New Radio), LTE-M (Machine Type communication) and NB-IoT (Narrowband Internet-of-Things). In the context of the present disclosure, the term '5G' can additionally refer to any further evolving cellular communication technology, such as 6G, and which advantageously allows setting up private, i.e. non-public cellular radio communication networks, specifically for mission critical communication.

Advantageously, 5G communication module 117 along with antenna 118 are configured to operate as a transceiver for 5G radio communications. 5G communication module 117 is connected to power supply module 113 for drawing electrical power for operation.

One advantage of equipping the remote surveillance units with a 5G communication module is that existing ground infrastructure of the multilateration system can be used for rolling out a 5G cellular network providing optimal coverage of the airfield area. This reduces total installation costs. Furthermore, power supply circuitry can be shared between the receiver/control/transmitter modules of the multilateration system and the 5G communication module.

Advantageously, when multiple and preferably all remote surveillance units 11 of the multilateration system 10 are equipped with a 5G communication module 117 and 5G antenna 118, a 5G cellular network 15 can be set up covering the operation area of the multilateration system. Advantageously, the 5G communication modules are configured to set up a private 5G cellular network. The private 5G cellular network advantageously covers an area corresponding at least to the airport movement area, in particular the airport manoeuvring areas (including taxiways and runways), which area may correspond to the area covered by the airfield multilateration system. Possibly, all the airfield surveillance units of the airfield multilateration system are equipped with the 5G communication modules and second radio antennas. Any of the 5G modules can be configured as a base station of the (mission critical) private 5G network. Alternatively, the base station of the private 5G network can be provided as a separate unit and communicating with the 5G communication modules.

A private cellular communications network refers to a non-public broadband radio access technology communications network where network infrastructure is deployed across an area utilized by a private organisation, such as though not limited to an airfield operator, e.g. for air traffic control and/or airfield ground operations, and where the network infrastructure is used exclusively by devices authorised by the organisation. Devices which are registered on a public cellular communications networks will not work on the private network unless where specifically authorised by the organisation. A private network may operate in a radio frequency spectrum allocated for private (non-public) use. A private network typically ensures high bandwidth coverage, predictable error and delay characteristics, reduced latency and/or device capacity to ensure efficiency and safety. In a 5G private network, network bandwidth can be delivered at scale to suit the needs of the end user organisation for optimal quality of service and network resiliency. Time critical applications can be enabled through Time Synchronization Network (TSN) features. 5G private cellular communication networks can be implemented with Ultra Reliable Low Latency Communications (URLLC), with radio network latency reduced to 2 ms or less, such as 1 ms, along with a network reliability higher than 99.99%, and even 99.999%, enabling high reliability real-time applications. A 5G private network can offer superior security due to strong authorisation, authentication and access control features, such as data encryption and integrity protection mechanisms, 'Time Sensitive Network' bridges into which the private network can be integrated to safeguard time-sensitive communications from network attacks.

In addition, or alternatively, the 5G communication modules can be configured to provide public networking capability, i.e. providing radio access through a public 5G network provider. The (private) 5G cellular network can be so configured to provide for mission critical communications, either for the multilateration system itself, for external providers, e.g. in case of emergency situations such as fire, rescue and security services, or for both.

Advantageously, the 5G communication module 117 comprises a data communication port 1171 which is coupled to a data communication port of the receiver module 112, e.g. data communication port 1123. The data communication link between port 1171 and port 1123 can be configured for unidirectional data communication, e.g. from the 5G communication module to the receiver module 112 or vice versa, or advantageously for bidirectional data communication. In addition or alternatively, 5G communication module 117 advantageously comprises a data communication port 1172 coupled to a data communication port 1141 of the transmitter module 114, which can be for unidirectional or bidirectional data communication. In the example of FIG. 2, the connections between ports 1171 and 1172 on the one hand, and ports 1122 and 1141 on the other hand are provided via the control module 116, although this is not a requirement.

By connecting the receiver module 112 and/or the transmitter module 114 to the 5G communication module for data communication, it becomes possible to use the (private) 5G cellular network for data communication between the remote surveillance units and the central processing unit, e.g. for communicating the transponder messages received and processed by the receiver modules 112 to the central processing unit 12. The (private) 5G network set up by the 5G communication modules 117 can be used as an additional communication link, in addition to (wired) data communication link 13. Alternatively, in particular in case of newly installed remote surveillance units, or remote surveillance units arranged at remote locations in the airfield area where a wired data communication line is not available, the (private) 5G network set up by the 5G communication modules 117 can be used to replace the (wired) data communication link 13. It will therefore be appreciated that a data communication port coupled to data communication link 13 is optional in remote surveillance units 11 as described herein.

In the multilateration system 10, one remote surveillance unit 11 can be configured to operate as a reference remote surveillance unit gathering all multilateration-related data communicated by the 5G communication modules 117 via the (private) 5G network and feeding this data to the central processing unit 12, e.g. via data communication link 13. Alternatively, referring again to FIG. 4, the central processing unit 12 can comprise a 5G communication module 127 and 5G antenna 128 which are coupled for data communication with the computing and control module 121. By so doing, a direct communication link between the central processing unit 12 and the remote surveillance units 11 via the (private) 5G network can be provided. Advantageously, any multilateration-related communication between the central processing unit and the remote surveillance units and/or between different remote surveillance units that is performed via the 5G network can be performed as mission critical communications within the (private) 5G network.

The data communication between receiver module 112 and/or transmitter module 114 on the one hand and 5G communication module 117 on the other can be used for communicating any or all data between different remote surveillance units and any and all data between the remote surveillance unit and the central processing unit as described above.

By way of example, the data communication between receiver module 112 and 5G communication module 117 can comprise time information which can be processed by receiver module 112 to time-stamp the received transponder messages. The time information is advantageously received by the remote surveillance units allowing to synchronize their internal clocks for correct and synchronized time-stamping purposes.

In addition or alternatively, the data communication between transmitter module 114 and 5G communication module 117 can comprise control or instruction messages sent by the central processing unit 12 to the transmitter module 114, e.g. instruction messages for interrogating the transponder of an aircraft or vehicle.

The use of the 5G communication channel as alternative synchronization method advantageously helps in decongesting the 1030/1090 MHz channel. Whilst transponder interrogations by the transmitter modules provide a degree of autonomy and reliable performance, the interrogations introduce a load upon the 1030/1090 MHz channel capacity and contribute to transponder occupancy. Congestion of the 1030/1090 MHz spectrum and excessive transponder occupancy are major issues facing European surveillance infrastructure. Therefore, avoiding non-interrogation messages by using the 5G channel can be beneficial.

The radio antennas 111, 115 and 118 can be provided as separate antennas which can be arranged on a same mast. Alternatively 5G antenna 118 can be integrated with any one of receive antenna 111 and transmit antenna 115 in a single antenna. Typical mast heights for radio antennas 111 and 115 are between 4 m and 10 m. The antennas and/or masts can be arranged on airfield buildings, in which case the achievable heights can be even greater, e.g. up to 40 m or even 60 m, obtaining increased aerial coverage to allow for determining positions of air objects via multilateration, e.g. approaching the airfield, in wide area multilateration.

Embodiments of the present disclosure are defined by the following numbered clauses:

1. Airfield surveillance unit (11) for detecting airfield traffic, comprising:
   a power supply module (113),
   a first radio antenna (111) configured to receive an aircraft transponder signal,
   a receiver module (112) coupled to the power supply module (113) and configured to be coupled to the first radio antenna (111) and comprising a first data communication port (1122, 1123),
   wherein the receiver module (112) is operable to convert the aircraft transponder signal received by the first radio antenna (111) for transmission via the first data communication port, wherein the converted aircraft transponder signal allows for determining a position of a corresponding aircraft via multilateration,
   characterised in that the airfield surveillance unit further comprises:
   a second radio antenna (118) configured to receive and/or transmit 5G radio signals, and
   a 5G communication module (117) coupled to the power supply module (113) and configured to be coupled to the second radio antenna and operable to process 5G radio signals received or transmitted by the second radio antenna.

2. Airfield surveillance unit of clause 1, wherein the receiver module (112) and the 5G communication module (117) are operably coupled for data communication.

3. Airfield surveillance unit of clause 2, wherein the data communication between the receiver module (112) and the 5G communication module (117) is unidirectional or bidirectional.

4. Airfield surveillance unit of any one of the preceding clauses, wherein the 5G communication module (117) comprises a data communication port (1171) connected to the first data communication port (1123) of the receiver module for receiving the converted aircraft transponder signal, and wherein the 5G communication module is configured to process the converted aircraft transponder signal for transmission via the second radio antenna (118).

5. Airfield surveillance unit of clause 4, wherein the receiver module (112) comprises a second data communication port (1122), wherein the receiver module is operable to selectively communicate the converted aircraft transponder signal via the first data communication port (1123) and the second data communication port (1122).

6. Airfield surveillance unit of clause 5, wherein the second data communication port (1122) is configured to be coupled to a wired data communication line (13).

7. Airfield surveillance unit of any one of the clauses 2 to 6, wherein the 5G communication module (117) is operable to communicate a time synchronization signal to the receiver module (112).

8. Airfield surveillance unit of any one of the preceding clauses, wherein the receiver module (112) is operable to apply a time-stamp to the aircraft transponder signal.

9. Airfield surveillance unit of any one of the preceding clauses, further comprising a transmitter module (114) operably coupled to the first radio antenna or to a further radio antenna, wherein the transmitter module is configured to transmit transponder interrogation signals.

10. Airfield surveillance unit of any one of the preceding clauses, wherein the first radio antenna (111) is configured for receiving 1090 MHz signals.

11. Airfield surveillance unit of any one of the preceding clauses, wherein the first radio antenna (111) and the second radio antenna (118) are distinct.

12. Airfield surveillance unit of any one of the clauses 1 to 10, wherein the first radio antenna and the second radio antenna are integrated in a single antenna assembly.

13. Airfield multilateration system (10), comprising:
a plurality of airfield surveillance units (11) according to any one of the preceding clauses, and
a central processing unit (12) operable for data communication with the plurality of airfield surveillance units (11) and comprising a computing module (121) operable to determine an aircraft position based on the aircraft transponder signal received by multiple ones of the plurality of airfield surveillance units.

14. Airfield multilateration system of clause 13, wherein the computing module (121) is operable to perform multilateration computing based on time difference of arrival of the aircraft transponder signal received by the multiple ones of the plurality of airfield surveillance units (11).

15. Airfield multilateration system of clause 13 or 14, wherein the 5G communication modules (117) of the plurality of airfield surveillance units are configured to form a private 5G cellular network.

16. Airfield multilateration system of clause 15, wherein the private 5G cellular network allows for mission critical communication.

17. Airfield multilateration system of any one of clauses 13 to 16, wherein the central processing unit (12) comprises a 5G communication module (127) and a 5G radio antenna (128) coupled to the 5G communication module (127) of the central processing unit.

18. Airfield multilateration system of clause 17, wherein the 5G communication module (127) of the central processing unit and the computing module (121) are coupled for data communication.

19. Airfield multilateration system of any one of clauses 13 to 18, wherein the 5G communication modules (117) of the plurality of airfield surveillance units (11) are configured to set up a 5G cellular network, and wherein the central processing unit (12) is operable for data communication with the plurality of airfield surveillance units (11) through the 5G cellular network.

20. Airfield multilateration system of any one of the clauses 13 to 19, comprising a wired data communication line (13), and wherein the central processing unit (12) is operable for data communication with the plurality of airfield surveillance units (11) through the wired data communication line (13).

21. Airfield multilateration system of clause 19 in conjunction with clause 20, wherein the central processing unit (12) is operable for data communication with the plurality of airfield surveillance units (11) selectively through the 5G cellular network and through the wired data communication line.

22. Airport (100), comprising an airfield and the airfield multilateration system of any one of clauses 13 to 21.

The invention claimed is:

1. An airfield multilateration system (10) for detecting airfield traffic, the airfield multilateration system comprising a plurality of airfield surveillance units (11), each of the plurality of airfield surveillance units comprising:
a power supply module (113),
a first radio antenna (111) configured to receive an aircraft transponder signal,
a receiver module (112) coupled to the power supply module (113) and configured to be coupled to the first radio antenna (111) and comprising a first data communication port (1122, 1123),
wherein the receiver module (112) is operable to convert the aircraft transponder signal received by the first radio antenna (111) for transmission via the first data communication port, wherein the converted aircraft transponder signal allows for determining a position of a corresponding aircraft via multilateration,
wherein each of the plurality of airfield surveillance units further comprises:
a second radio antenna (118) configured to receive and transmit 5G radio signals, and
a 5G communication module (117) coupled to the power supply module (113) and configured to be coupled to the second radio antenna and operable to process 5G radio signals received or transmitted by the second radio antenna,
wherein the airfield multilateration system further comprises a central processing unit (12) operable for data communication with the plurality of airfield surveillance units (11), the central processing unit comprising a computing module (121) operable to determine an aircraft position based on the aircraft transponder signal received by multiple ones of the plurality of airfield surveillance units,
a wired data communication line (13),
wherein the 5G communication modules (117) of the plurality of airfield surveillance units (11) are configured to form a private 5G cellular network, and
wherein the central processing unit (12) is operable for data communication with the plurality of airfield surveillance units (11) selectively through the 5G cellular network and through the wired data communication line.

2. The airfield multilateration system of claim 1, wherein the receiver module (112) and the 5G communication module (117) of each of the plurality of airfield surveillance units are operably coupled for data communication.

3. The airfield multilateration system of claim 2, wherein the 5G communication module (117) is operable to communicate a time synchronization signal to the receiver module (112) of the respective airfield surveillance unit.

4. The airfield multilateration system of claim 1, wherein the 5G communication module (117) comprises a data communication port (1171) connected to the first data communication port (1123) of the receiver module of the respective airfield surveillance unit for receiving the converted aircraft transponder signal, and wherein the 5G communication module is configured to process the converted aircraft transponder signal for transmission via the second radio antenna (118).

5. The airfield multilateration system of claim 4, wherein the receiver module (112) comprises a second data communication port (1122), wherein the receiver module is operable to selectively communicate the converted aircraft transponder signal via the first data communication port (1123) and the second data communication port (1122).

6. The airfield multilateration system of claim 5, wherein the second data communication port (1122) is configured to be coupled to a wired data communication line (13).

7. The airfield multilateration system of claim 1, wherein the receiver module (112) is operable to apply a time-stamp to the aircraft transponder signal.

8. The airfield multilateration system of claim 1, wherein the first radio antenna (111) is configured to receive 1090 MHz signals.

9. The airfield multilateration system of claim 1, wherein the first radio antenna (111) and the second radio antenna (118) of a respective airfield surveillance unit are distinct.

10. The airfield multilateration system of claim 1, wherein the first radio antenna and the second radio antenna of a respective airfield surveillance unit are integrated in a single antenna assembly.

11. The airfield multilateration system of claim 1, wherein the computing module (121) is operable to perform multilateration computing based on time difference of arrival of the aircraft transponder signal received by the multiple ones of the plurality of airfield surveillance units (11).

12. The airfield multilateration system of claim 1, wherein the private 5G cellular network is configured for mission critical communication.

13. The airfield multilateration system of claim 1, wherein the central processing unit (12) comprises a 5G communication module (127) and a 5G radio antenna (128) coupled to the 5G communication module (127) of the central processing unit.

14. The airfield multilateration system of claim 13, wherein the 5G communication module (127) of the central processing unit and the computing module (121) are coupled for data communication.

15. The airfield multilateration system of claim 1, wherein the central processing unit (12) is operable for data communication with the plurality of airfield surveillance units (11) through the private 5G cellular network.

16. An airport (100), comprising an airfield and the airfield multilateration system of claim 1.

17. An airfield multilateration system for detecting airfield traffic, the airfield multilateration system comprising a plurality of airfield surveillance units, each of the plurality of airfield surveillance units comprising:

a power supply module, a first radio antenna configured to receive an aircraft transponder signal, a receiver module coupled to the power supply module and configured to be coupled to the first radio antenna and comprising a first data communication port, wherein the receiver module is operable to convert the aircraft transponder signal received by the first radio antenna for transmission via the first data communication port, wherein the converted aircraft transponder signal allows for determining a position of a corresponding aircraft via multilateration, wherein each of the plurality of airfield surveillance units further comprises:

a second radio antenna configured to receive and transmit 5G radio signals, and a 5G communication module coupled to the power supply module and configured to be coupled to the second radio antenna and operable to process 5G radio signals received or transmitted by the second radio antenna, wherein the airfield multilateration system further comprises a central processing unit operable for data communication with the plurality of airfield surveillance units, the central processing unit comprising a computing module operable to determine an aircraft position based on the aircraft transponder signal received by multiple ones of the plurality of airfield surveillance units, a wired data communication line, wherein the 5G communication modules of the plurality of airfield surveillance units are configured to set up a private 5G cellular network, and wherein the central processing unit is operable for data communication with the plurality of airfield surveillance units selectively through the 5G cellular network and through the wired data communication line.

18. The airfield multilateration system of claim 17, wherein the central processing unit is operable for data communication with the plurality of airfield surveillance units through the private 5G cellular network.

* * * * *